June 20, 1944. V. SMEJKAL 2,352,026
BRIGHT OPTICAL SYSTEM FOR COLOR PHOTOGRAPHY
Filed Oct. 24, 1940
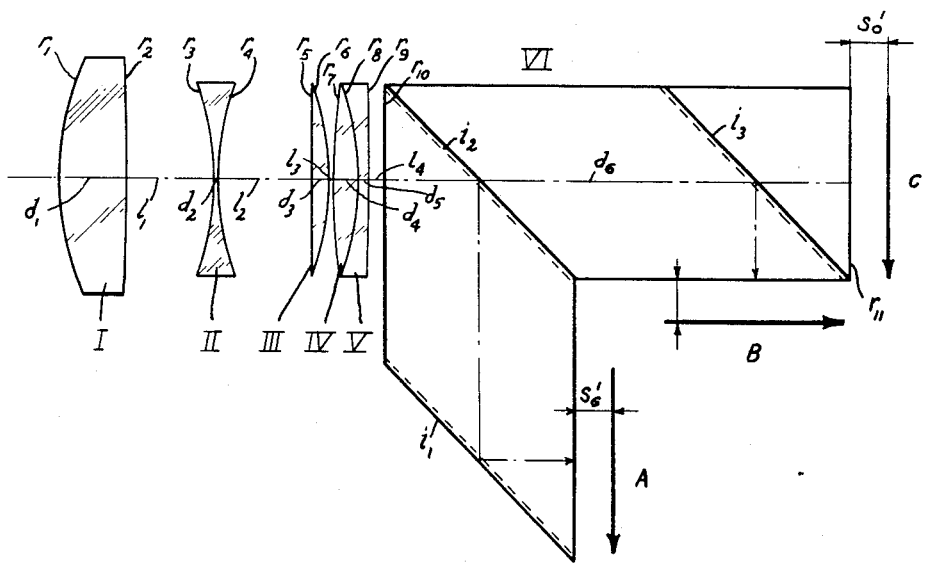
INVENTOR
Vilem Smejkal
ATTORNEY.

Patented June 20, 1944

2,352,026

UNITED STATES PATENT OFFICE 2,352,026

BRIGHT OPTICAL SYSTEM FOR COLOR PHOTOGRAPHY

Vilém Smejkal, Prerau, Moravia; vested in the Alien Property Custodian

Application October 24, 1940, Serial No. 362,652
In Czechoslovakia October 13, 1939

4 Claims. (Cl. 88—57)

The object of the invention is a very bright optical system for color photography, particularly for photographic cameras used in three or four color photography. The system consists of an objective and a prismatic spectral division system in which partial beams of light are separated from the entering rays by passing through reflectors and produce in the respective focal plans partial images.

To get the objective corrected in the focal plane behind the prismatic spectral division system the following conditions are to be complied with:

1. The chromatic deviations of the intersections must be chosen so that certain of their values be maintained behind the spectral division system in order to obtain a favorable spherochromatic correction.

2. The chromatic deviations of the focal distance must be as small as possible to obtain partial images of as much as possible equal size.

3. The objective must be under or subcorrected so that the value of the subcorrection corresponds to the value of the subcorrection created by the prismatic spectral division system.

4. The coma and the sine conditions of the objective connected with the spectral division system must be well corrected.

5. The value of the supercorrection of the astigmatism must be such as to be over or supercorrected with the contrary sign of the spectral division system.

6. The distortion must have positive values because the distortion of the prisms of the spectral division system has negative values.

In the case of hyperchromatic objectives that were used until now in color photography, the chromatic aberration of magnification is not only maintained but certainly increased, but on account of the spectral division system employed, the aberrations are suitably removed. The well known special hyperchromatic objectives with prismatic spectral division systems had no exact corrections for three or four elementary colors and besides that their brightness was insufficient. A system has been proposed in which a negative optical, chromatically corrected element is set before the normal objective of projection and in which the distance between the two elements corresponds at least to the focal distance of the objective of projection, but this has the disadvantage that the brightness of the objective is greatly diminished and that the optical system has extraordinary dimensions. On account of their small brightness these objectives have not been used in the spectral division system for color photography.

The disadvantages and wants of objectives until now in use in color photography have been removed by the special arrangement of the objective which forms the object of the present invention complying with all conditions required from an objective for such purpose, i. e. chromatic, spherical and astigmatic corrections as well as correction of coma and distortion. This invention is characterized by the ratio of the radius of the frontal convex surface of the first element of the objective on the side of or facing the object to be photographed and the focal distance of the objective being smaller than 1:2.5. The objective consists suitably of a biconvex lens as first element and a plano-convex lens as third element, the distance of the frontal curved surface of the first element being greater by a third of the focal distance of the objective from the surface of the third element facing the object to be photographed. An advantage of the new objective is its high hyperchromatism together with its easy production and execution, for the second element—a dispersion lens—is of a symmetrical form and two radii of the remaining elements may be equal and one surface of such remaining elements may be plane. In comparison with all optical systems known up to now, the new optical system offers the advantage of a more precise correction for three or four colors of the partial image i. e. for the red, yellow and blue (eventually grey) colors used in the three or multicolor photography as well as a complete correction of the coma and the distortion. The objective is moreover characterised by its considerable brightness required in color photography.

In order that the present invention may be clearly understood and readily carried into effect, the same will now be described more fully, by way of example, with reference to the accompanying drawing wherein The figure is a section taken along the axis of the optical system forming the subject of the invention.

The objective itself consists of five elements having eight surfaces that are in contact with the air. The first element I is a condensing element consisting of a biconvex lens. This lens is made so that the ratio of the radius $r_1$ of the frontal convex surface facing the object to be photographed and the focal distance of the objective is no less than 1:2.5, that is to say $$\frac{r_1}{f} < 1:2.5$$

The second element II is a dispersion element consisting of one biconcave lens. The best results are obtained if the radius of curvature of the biconcave lens II is from 0.5 to 0.7 of the focal distance $f$ of the objective. The third element III is again a condensing element consisting of a plano-convex lens. The last two elements IV and V are joined and form a double condensing element.

The first and the third element (I, III) are placed in such a manner that the distance between the frontal curved surface of the first element I and the straight plane of the plano-convex lens III will be greater than the third of the focal distance of the objective, i. e.

$$d_2 + d_1 + l_1 + l_2 > \frac{f}{3}$$

The distance between the frontal curved surface of the condensing element and the frontal curved surface of the biconvex lens II is chosen so as to be greater than a fifth of the focal distance of the objective, i. e.

$$d_1 + l_1 > \frac{f}{5}$$

The prismatic spectral division system VI placed behind the described objective is provided with the optical reflecting surfaces $i_1$, $i_2$, $i_3$ where the entering beams enter without obstacle into the focal plane, whilst the marginal beams are reflected through the optical surfaces in the direction of the respective focal planes, where all partial beams are of an absolutely equal length since they follow light paths of substantially equal lengths. A, B, C represent partial images of equal size of which the image B is reverse with regard to the images A and C.

The values of the optical system for an objective of a great brightness and a focal distance $f=100$ are f. i. the following ones:

| | |
|---|---|
| $r_1 = 56.37$ | $d_1 = 13.4$ |
| $r_2 = 287.8$ | $l_1 = 17.1$ |
| $r_3 = 60.82$ | $d_2 = 2.2$ |
| $r_4 = 60.82$ | $l_2 = 18.5$ |
| $r_5 = \infty$ | $d_3 = 4.5$ |
| $r_6 = 54.89$ | $l_3 = 0.1$ |
| $r_7 = 180.98$ | $d_4 = 5.9$ |
| $r_8 = 38.57$ | $d_5 = 1.5$ |
| $r_9 = 180.98$ | $l_4 = 1.78$ |
| $r_{10} = \infty$ | $d_6 = 94.31$ |
| $r_{11} = \infty$ | |

| | Kinds of glasses | | | | | |
|---|---|---|---|---|---|---|
| | I | II | III | IV | V | VI |
| $N_D =$ | 1.56857 | 1.62392 | 1.58890 | 1.588890 | 1.61300 | 1.51802 |
| $\nu =$ | 42.6 | 36.0 | 60.5 | 60.5 | 37.1 | 64.4 |

The exact calculation of the objective gives:

For the line C _____ $s_C = 8.675$   $f_C = 100.044$
For the line D _____ $s_D = 8.557$   $f_D = 100.00$
For the line G _____ $s_G = 8.189$   $f_G = 100.015$ The optical system of the afore mentioned values have then a high apochromacy, for the differences of focal distances $f$ do not go beyond 0.3%. A diminution of the chromatic deviation of the intersections may be produced by a spectral division system made of glass and the Abbé-number ($\nu$) of which differs from the indicated value.

If $\nu_1$ is the Abbé-number of the first element of the optical system and $\nu_2$ the Abbé-number of the second element of the optical system and $\varphi_1$ the refractivity of the first element and $\varphi_2$ the refractivity of the second element of the system, then is the refractivity of the first two elements $$\frac{\phi_1 + \phi_2}{\nu_1 + \nu_2}$$

This designed and described optical system for color photography is of course only an example for the execution of this invention and particulars of the system may be altered without going beyond the outlines of the present invention.

What I claim is:

1. In a photographic objective, the combination of five aligned optical elements having eight surfaces in contact with the air, the front element of said objective being a condensing element and located nearest an object to be photographed, the second element being a dispersive element, the third element being a condensing element and the fourth and fifth elements forming a doublet which is spaced from the third element, the radius of curvature of the front surface of the front element bearing a relation to the focal length of the objective which is less than the ratio of 1:2.5, the front surface of the front element and the third element being separated by a distance which is greater than one-third of the focal length of the objective, the front surfaces of the front element and the second element being separated by a distance which is greater than one-fifth of the focal length of the objective, and the surfaces of the second element each having a radius of curvature which may vary from 0.5 to 0.7 of the focal length of the objective.

2. In a photographic objective as set forth in claim 1, the combination wherein said front element is a biconvex lens, the second element is a biconcave lens, the third element is a plano-convex lens with the plane side thereof facing the object and the fourth and fifth elements are respectively a biconvex lens and a concavo-convex lens.

3. In an optical system used in multi-color photography to form a plurality of images of the same object field and comprising an objective and light dividing means aligned with said objective on the image side thereof for dividing the light transmitted through the objective into a plurality of separate but similar image bearing beams, the combination of an objective formed of five optically aligned lens elements having eight air contacting surfaces, the front element of said five elements being a condensing element and positioned nearest an object to be photographed, the radius of curvature of the front surface of the front element having a ratio to the focal length of the objective which is less than the ratio of 1:2.5, the second element being a dispersive element which has its front surface spaced from the front surface of the first element by a distance which is greater than one-fifth of the focal length and a radius of curvature for its two surfaces which lies between 0.5 and 0.7 of the focal length of the objective, the third element being a condensing element and having its front surface spaced from the front surface of the first element by a distance greater than one-third the focal length of the objective, the fourth and fifth elements being joined to each other to provide a condensing doublet which is spaced from the third element.

4. An optical objective having numerical data as set forth in the following table:

$f_C = 100.44$   $f_D = 100.00$   $f_G = 100.015$

| Element | Radius | Thickness or separation | Refractive index No. | Abbé number |
|---|---|---|---|---|
| I | $r_1 = 56.37$ | $d_1 = 13.4$ | 1.56857 | 42.6 |
|   | $r_2 = 287.8$ | $l_1 = 17.1$ | | |
| II | $r_3 = 60.82$ | $d_2 = 2.2$ | 1.62392 | 36.0 |
|   | $r_4 = 60.82$ | $l_2 = 18.5$ | | |
| III | $r_5 = \infty$ | $d_3 = 4.5$ | 1.58890 | 60.5 |
|   | $r_6 = 54.89$ | $l_3 = 0.1$ | | |
| IV | $r_7 = 180.98$ | $d_4 = 5.9$ | 1.588890 | 60.5 |
| V | $r_8 = 38.57$ | $d_5 = 1.5$ | 1.61300 | 37.1 |
|   | $r_9 = 180.98$ | | | | wherein $f_C$, $f_D$, $f_G$, are respectively the focal lengths of the objective for the C, D, and G lines of the spectrum, $r_1$, $r_2$ ... are the radii of curvature of the individual lens elements, $d_1$, $d_2$ ... are the axial thickness of the individual lens elements, and $l_1$, $l_2$ ... are the axial air spaces between lens elements.

VILÉM SMEJKAL.